US006898165B2

(12) United States Patent
Kikuchi

(10) Patent No.: US 6,898,165 B2
(45) Date of Patent: May 24, 2005

(54) REPRODUCER CAPABLE OF CHANGING A REPRODUCING SPEED IN ACCORDANCE WITH A SCRATCH OPERATION

(75) Inventor: Tomohiko Kikuchi, Musashimurayama (JP)

(73) Assignee: Teac Corporation, Tokyo (JP)

( * ) Notice: Subject to any disclaimer, the term of this patent is extended or adjusted under 35 U.S.C. 154(b) by 339 days.

(21) Appl. No.: 10/314,075

(22) Filed: Dec. 6, 2002

(65) Prior Publication Data

US 2003/0165100 A1 Sep. 4, 2003

(30) Foreign Application Priority Data

Mar. 4, 2002 (JP) ........................................ 2002-057826

(51) Int. Cl.$^7$ ................................................ G11B 7/00
(52) U.S. Cl. ..................... 369/53.3; 369/47.38; 369/264
(58) Field of Search ............................. 369/53.3, 47.3, 369/47.38, 47.39, 264, 267, 263

(56) References Cited

U.S. PATENT DOCUMENTS 5,602,812 A * 2/1997 Miura et al. ............... 369/47.3

FOREIGN PATENT DOCUMENTS

JP 2000-182318 6/2000

* cited by examiner

Primary Examiner—Nabil Hindi
(74) Attorney, Agent, or Firm—Anderson, Kill & Olick, P.C.; Eugene Lieberstein; Michael N. Meller

(57) ABSTRACT

A reproducer can enhance detection accuracy with respect to a rotational motion according to a scratch operation and properly change a reproducing speed of a recording medium. A turntable of a scratch operating part comprises a disk-shaped mounting plate, which is made from metal, fixed on the upper end of a bushing, a ring-shaped grooved member fixed on a marginal area of the under surface of the mounting plate with mounting bolts, and a marginal member fixed on an outer area of the ring-shaped grooved member. A disk has a disk surface on rollers provided on the top surface of the turntable and a ring-shaped detected part located around an outer circumference of the disk surface and projecting from the under surface of the disk. A light receiving element supplies a signal with a frequency proportional to a period in which a concave part and a convex part pass according to the rotational speed of the disk. Since the rotational speed of the disk operated by an operator can be directly detected, it is possible to enhance detection accuracy.

5 Claims, 8 Drawing Sheets

REPRODUCER CAPABLE OF CHANGING A REPRODUCING SPEED IN ACCORDANCE WITH A SCRATCH OPERATION

BACKGROUND OF THE INVENTION

1. Field of the Invention

The present invention generally relates to reproducers, and more particularly to a reproducer wherein a reproducing speed of a recording medium such as a CD (compact disk) can be changed according to a scratch operation.

2. Description of the Related Art

There is an operation method such that a sound breaks halfway into another sound being currently reproduced by means of a scratch operation in which a DJ (disk jockey) changes a rotational direction and a rotational speed of a phonograph record. Reproducers in which such, a scratch operation can be also performed on a CD have been developed.

In a conventional reproducer as mentioned in Japanese Laid-Open Paten Application No. 2000-182318, a CD reproducing part and a scratch operating part having a turntable on which the scratch operation is performed are provided in the reproducer. The scratch operating part has a rotation detecting unit detecting a rotational motion caused by the scratch operation in a rotational axis of the turntable. Based on a speed of the rotation obtained through the rotation detecting unit, the reproducer performs a reproducing process by appropriately changing a reproducing speed of the CD reproducing part so that a sound can break halfway into another sound being currently reproduced.

In the above-mentioned conventional reproducer, the turntable of the scratch operating part is pressed in a clockwise direction or a counterclockwise direction so as to change the rotational direction and the rotational speed. In this case, unlike a phonograph record, a rotational speed of a disk on the turntable is not changed relative to a rotational speed of the turntable. Additionally, since the scratch operation has to be performed against a rotational force of the turntable, extra power is required to perform the scratch operation.

Also, a conventional reproducer detects a rotational motion in a rotational axis of the turntable through the rotation detecting unit. It is difficult to enhance the detection accuracy because the number of pulses available to detect the scratch operation is small with respect to a rotational angle in the conventional reproducer.

SUMMARY OF THE INVENTION

It is a general object of the present invention to provide a reproducer in which the above-mentioned problems are eliminated.

A more specific object of the present invention is to provide a reproducer that can enhance detection accuracy with respect to a rotational motion according to a scratch operation and properly change a reproducing speed of a recording medium.

In order to achieve the above-mentioned objects, there is provided according to one aspect of the present invention a reproducer, comprising: a reproducing part reproducing information; a driving part transmitting a rotational force; a first rotational operating part rotationally driven by the driving part and rotationally driven manually; a second rotational operating part capable of integrally rotating together with the first rotational operating part and rotating relative to the first rotational operating part manually; a detecting part detecting a rotational motion of the second rotational operating part; and a control part changing a reproducing speed of the reproducing part according to a detection result of the detecting part.

According to the above-mentioned invention, since the second rotational operating part can rotate separately from the first rotational operating part, it is possible to easily perform a rotational operation without feeling rotational driving force. When the first rotational operating part, which corresponds to a turntable for an analog record reproducer, and the second rotational operating part, which corresponds to a record for the analog record reproducer, are operated, it is possible to perform a scratch operation equivalent to that under the analog record reproducer. Furthermore, when the detecting part detects a rotational motion of the second rotational operating part, it is possible to accurately detect a rotational motion of the second rotational operating part with respect to a manual operation.

In the above-mentioned reproducer, the second rotational operating part may have a detected part inserted into a transparent detection groove formed in the first rotational operating part, and the detecting part may detect the detected part in an inner circumference and an outer circumference of the detection groove.

Additionally, in the above-mentioned reproducer, the second rotational operating part may have a disk-shaped operation surface provided on the first rotational operating part and a ring-shaped detected part projecting downward from the disk-shaped operation surface, the operation surface operated by receiving pressure in a rotational direction, and the detecting part may detect a rotational speed and a rotational direction of the ring-shaped detected part.

According to the above-mentioned invention, since a rotational motion of the second rotational operating part is directly detected, it is possible to improve the detection accuracy with respect to the rotational motion.

In the above-mentioned reproducer, the detecting part may detect a rotational speed based upon a frequency of a signal detected by an optical sensor and a rotational direction based upon a phase difference of a signal detected by an optical sensor.

According to the above-mentioned invention, since the rotational speed and the rotational direction of the second rotational operating part wherein an operator performs a scratch operation are directly detected, it is possible to improve the detection accuracy with respect to the rotational motion.

In the above-mentioned reproducer, the first rotational operating part may have a turntable on which the second rotational operating part is placed, a first detected part provided integrally around an outer circumference of the turntable, a cavitary rotational axis sustaining the turntable capable of rotating, and a rotational axis piercing the cavitary rotational axis, the rotational axis connected with the second rotational operating part on one end of the rotational axis and a second detected part on the other end of the rotational axis.

According to the above-mentioned invention, it is possible to separately detect rotational motions of the first rotational operating part and the second rotational operating without mutual interference. In addition, since the rotational speed and the rotational direction of the second rotational operating part wherein an operator performs a scratch operation are directly detected, it is possible to improve the detection accuracy with respect to the rotational motion.

Other objects, features and advantages of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings.

Figure 1:
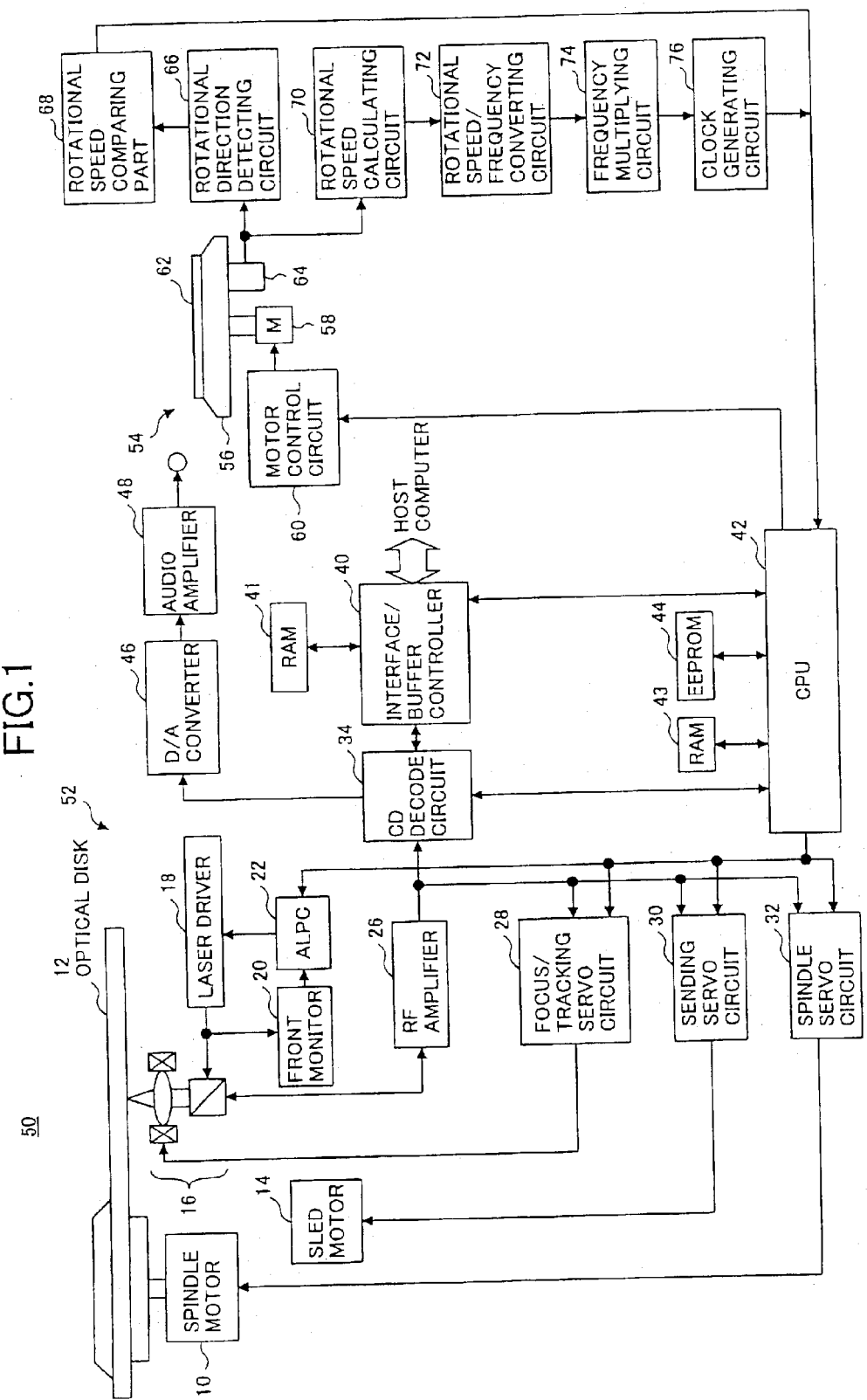
FIG. 1 is a block diagram illustrating a structure of a reproducer according to a first embodiment of the present invention.

FIG. 1 is a block diagram illustrating a structure of a reproducer according to the first embodiment of the present invention.

As is shown in FIG. 1, a reproducer 50 comprises a reproducing part 52 reproducing a sound recorded in a medium such as a CD and a scratch operating part 54 detecting a scratch operation performed by an operator.

First, a structure of the reproducing part 52 and then a structure of the scratch operating part 54 will be described.

A spindle motor 10 of the reproducing part 52 revolves an optical disk (CD) 12 at a predetermined speed. A sled motor 14 shifts an optical pickup 16 in a disk radius direction. The optical pickup 16 comprises. an optical object lens, an actuator, a ¼ wavelength plate, a collimator lens, a beam splitters a light emitting element (laser diode), a light receiving element (photodetector) and so on.

A laser driver 18 makes a laser diode emit light so as to generate a laser beam. A front monitor 20 detects a photo intensity of the laser beam. Based on an output from the front monitor, an ALPC (Automatic Laser Power Control) 22 controls the laser driver 18 so as to optimize the intensity of the laser beam.

An RF amplifier 26 is a head amplifier to amplify a reproducing signal. The RF amplifier 26, which includes a matrix amplifier, retrieves various servo signals as well as a main signal, which are supplied to each servo circuit. A focus/tracking servo circuit 28 drives the actuator and controls a focus servo and a tracking servo. A sending servo circuit 30 controls the driving of the sled motor 14. A spindle servo circuit 32 controls the driving of the spindle motor 10.

A CD decode circuit 34 performs an EFM (Eight to Fourteen Modulation), decodes a CIRC (Cross Interleaved Read-solomon Code), detects synchronism and so on.

An interface/buffer controller 40 serves to send/receive data to/from a host computer and control a data buffer. A RAM 41 is an auxiliary memory for temporally saving data to be processed. It is noted that the above host computer is connected to an operation panel, which is not illustrated in the drawings, in which various operation keys including a play key are provided and that ON/OFF conditions of the operation keys are communicated from the host computer to a CPU 42 via the interface/buffer controller 40.

The CPU (control part) 42 is a micro computer controlling all operations on a CD-R drive including mechanical operations. A RAM 43 is a working memory for the CPU 42. An EEPROM 44 is a memory in which the CPU 42 maintains various data. A D/A converter 46 converts audio data sent from the CD decode circuit 34 into an analog signal. An audio amplifier 48 amplifies the converted analog audio signal and outputs the amplified signal.

A scratch operating part 54 has a turntable (a first, rotational operating part) 56, a driving motor (driving part) 58 revolving the turntable 56, and a motor control circuit 60 controlling a driving operation on the driving motor 58. In the under surface of the turntable 56, the scratch operating part 54 has a sensor unit 64 detecting a rotational motion of a disk (a second rotational operating part) 62 placed on the turntable 56, a rotational direction detecting circuit 66 detecting a rotational direction of the disk 62, a rotational speed comparing circuit 68, a rotational speed calculating circuit 70, a rotational speed/frequency converting circuit 72, a frequency multiplying circuit 74, and a clock generating circuit 76.

The rotational speed comparing circuit 68 detects whether or not there is a discrepancy between a rotational speed of the disk 62 and a predetermined value (normal rotational speed) caused by a scratch operation. When receiving a voltage from the rotational speed calculating circuit 70, the rotational speed/frequency conversion circuit 72 generates an oscillation signal through a VOL (Voltage Controlled Oscillator) in the rotational speed/frequency conversion circuit 72. The clock generating circuit 76 forms a waveform from a signal supplied by the frequency multiplying-circuit 74 and supplies the resulting rectangular wave, which is translated as a clock signal, to the CPU 42.

The CPU 42 changes a pitch of a reproducing signal according to the clock signal supplied from the clock generating circuit 76 and adjusts a reproducing speed of the reproducer 50.

A description will be given, with reference to FIG. 2, FIG. 3A and FIG. 3B, of a structure of the scratch operating part 54.

Figure 2:
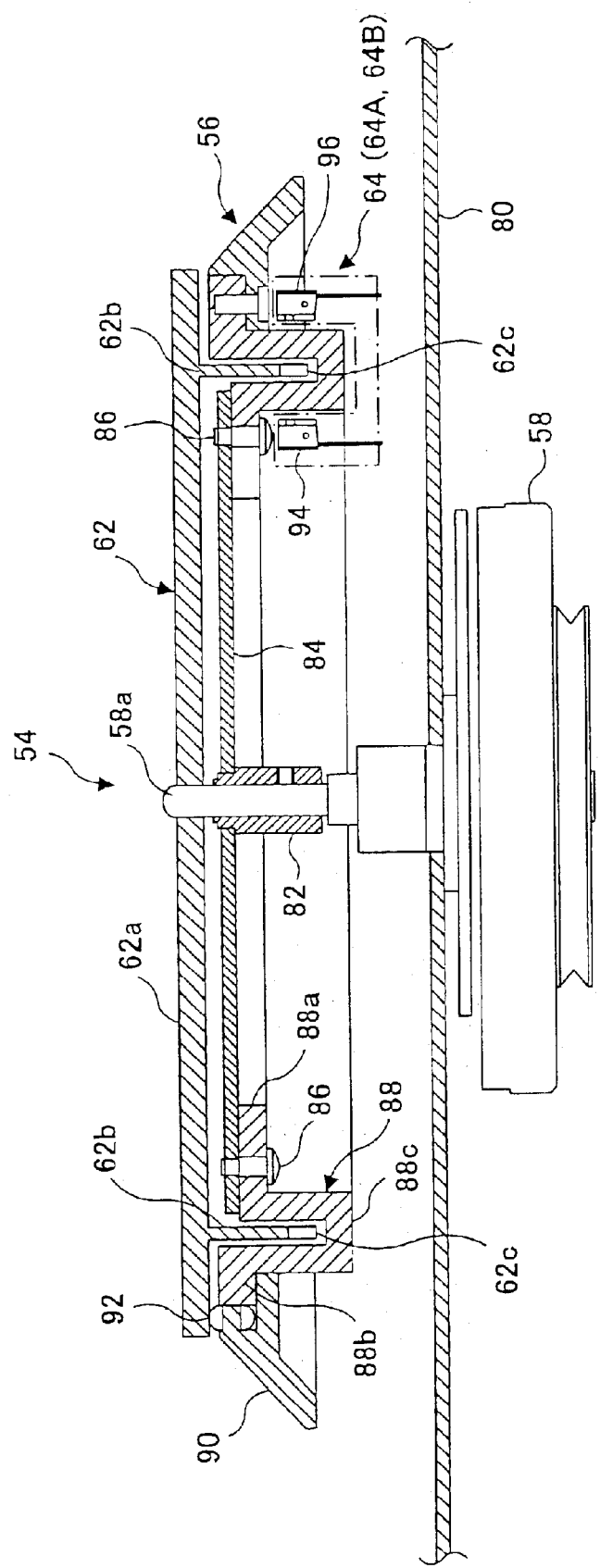
FIG. 2 is a longitudinal sectional view illustrating a scratch operating part according to the first embodiment.

FIG. 2 is a longitudinal sectional view of the scratch operating part 54 according to the first embodiment. FIG. 3A and FIG. 3B are a plan view and a side view of the disk 62, respectively.

As is shown in FIG. 2, in the scratch operating part 54, the driving motor 58 is provided under a chassis 80 and the turntable 56 is fixed to a bushing 82 combined with a rotational axis 58a of the driving motor 58.

The turntable 56 comprises a disk-shaped mounting plate 84, which is made from metal, fixed on the upper edge of the bushing 82, a ring-shaped grooved member 88 fixed on a marginal area of the under surface of the mounting plate 84 with mounting bolts 86, and a marginal member 90 fixed on an outer area of the ring-shaped grooved member 88.

The ring-shaped grooved member 88, which is formed of a transparent resin, has an inside flange 88a fixed on the disk-shaped mounting plate 84 and an outside flange 88b fixed on the marginal member 90. Additionally, the ring-shaped grooved member 88 has a groove forming part 88c whose section is U-shaped between the inside flange 88a and the outside flange 88b. The upper portion of the groove forming part 88c is opened.

Rollers 92 to facilitate a rotational motion of the disk 62 are provided at a predetermined interval on the top surface of the marginal member 90. When a scratch operation is performed for the disk 62 placed on the top surface of the turntable 56, a rotational speed of the disk 62 can be changed by a small amount of force with aid from the rollers 92. Here, a low friction material such as a super high polymer polyethylene may be used instead of the roller 92.

A sensor unit 64 is provided under the turntable 56 so as to face the inner and the outer circumferences of the ring-shaped grooved member 88. The sensor unit 64 comprises a pair of photo interrupters 64A and 64B. Since the photo interrupters 64A and 64B have an identical structure each other, only the photo interrupter 64A will be described here.

In the photo interrupter 64A, a light emitting element 94 and a light receiving element 96 are provided inside of and outside of the ring-shaped grooved member 88, respectively. When light from the light emitting element 94 passes through the groove forming part 88c of the ring-shaped grooved member 88, the light receiving element 96 receives the light and then generates a signal.

Here, the light emitting element 94 and the light receiving element 96 may be individually soldered on a substrate or may be molded into a U-shaped resin.

Figure 3A:
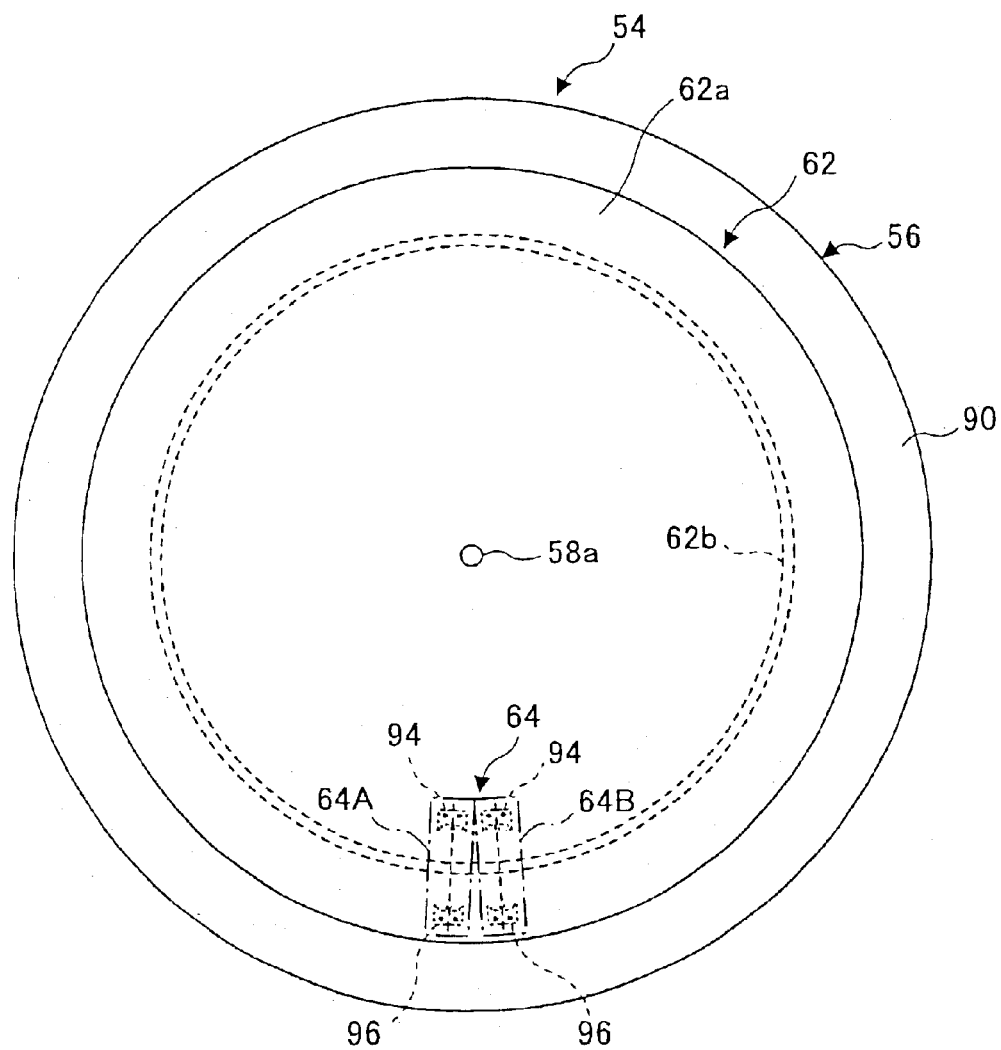
FIG. 3A is a plan view of a structure of a disk 62 according to the first embodiment.
Figure 3B:
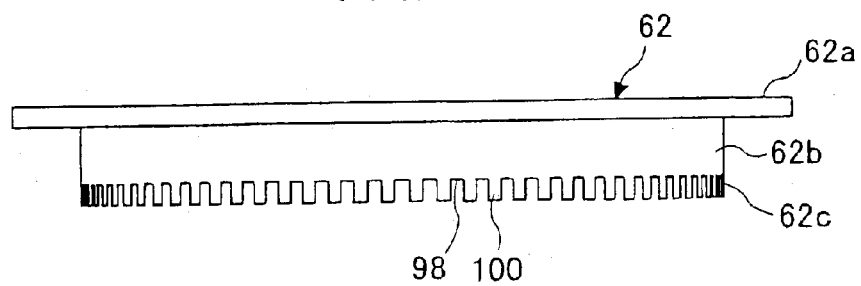
FIG. 3B is a side view of a structure of a disk 62 according to the first embodiment.

As is shown in FIG. 3A and FIG. 3B, the disk 62 has a disk surface 62a on the rollers 92 provided on the top surface of the turntable 56 and a ring-shaped detected part 62b located around an outer circumference of the disk surface 62a and projecting from the under surface of the disk 62. The ring-shaped detected part 62b has the same length of radius as the groove forming part 88c of the ring-shaped grooved member 88. When the disk surface 62a is placed on the turntable 56, the detected part 62b is inserted into the groove forming part 88c.

A rectangular concave part 98 and a rectangular convex part 100 are alternately formed in the lower edge of the detected part 62b. When the concave part 98 passes through the photo interrupters 64A and 64B, the light receiving element 96 receives light from the light emitting element 94. When the convex part 100 passes through the photo interrupters 64A and 64B, the convex part 100 interrupts the light from the light emitting element 94. As a result, the light receiving element 96 supplies a signal with a frequency proportional to a period in which the concave part 98 and the convex part 100 pass according to the rotational speed of the disk 62.

The reason that the detected part 62b is provided around the outer circumference of the disk 62 is why the radius of the detected part 62b can become as large as possible. In that case, since it is possible to increase the numbers of the concave parts 98 and the convex parts 100 relative to a rotational angle of the disk 62 and to increase the number of pulses to be detected, the detection accuracy is improved correspondingly to the increases.

In the above-mentioned configuration, the CPU 42 obtains the rotational speed of the disk 62 from the period or the frequency of the signal supplied by the photo interrupter 64A and determines the rotational direction of the disk 62 based upon signs +/− of a phase difference of a pair of signal waveforms supplied by the photo interrupters 64A and 64B. As a result, the CPU 42 can detect the rotational speed and the rotational direction of the disk 62 with respect to the case in which the scratch operation is performed. Based upon the detection result, a scratch sound is reproduced by changing the rotational speed and the rotational direction of the spindle motor 10 of the reproducing part 52.

Accordingly, the scratch operating part 54 can directly detect a rotational motion of the disk 62 being manipulated by an operator without detecting the rotation motion of the rotational axis of a motor as a conventional method. Thus, the detection accuracy is improved and the scratch sound is reproduced without delay caused by a detection error.

Additionally, since the disk 62 is simply placed on the turntable 56, it is possible to remove the disk 62 easily. When it is necessary to clean the disk surface 62a of the disk 62 due to dirt such as a mark of a fingerprint, the disk 62 may be easily replaced with another clean disk 62 to maintain a clean condition.

In the scratch operating part 54, it is possible to perform the scratch operation by revolving only the disk 62. Since the disk 62 can be revolved relative to the turntable 56 rotationally driven at a predetermined speed, the operator can perform the scratch operation as if the scratch operation were performed on an analog record reproducer. In the above construction, since the rotational force of the turntable 56 is not felt heavily, the operator can perform the scratch operation with a small force.

Furthermore, regarding the scratch operating part 54, the operator can simultaneously perform three kinds of operations: an operation on only the disk 62, an operation on only the turntable 56, and an operation on both the disk 62 and the turntable 56. Thus, the operator can perform a variety of reproducing operations.

Figure 4:
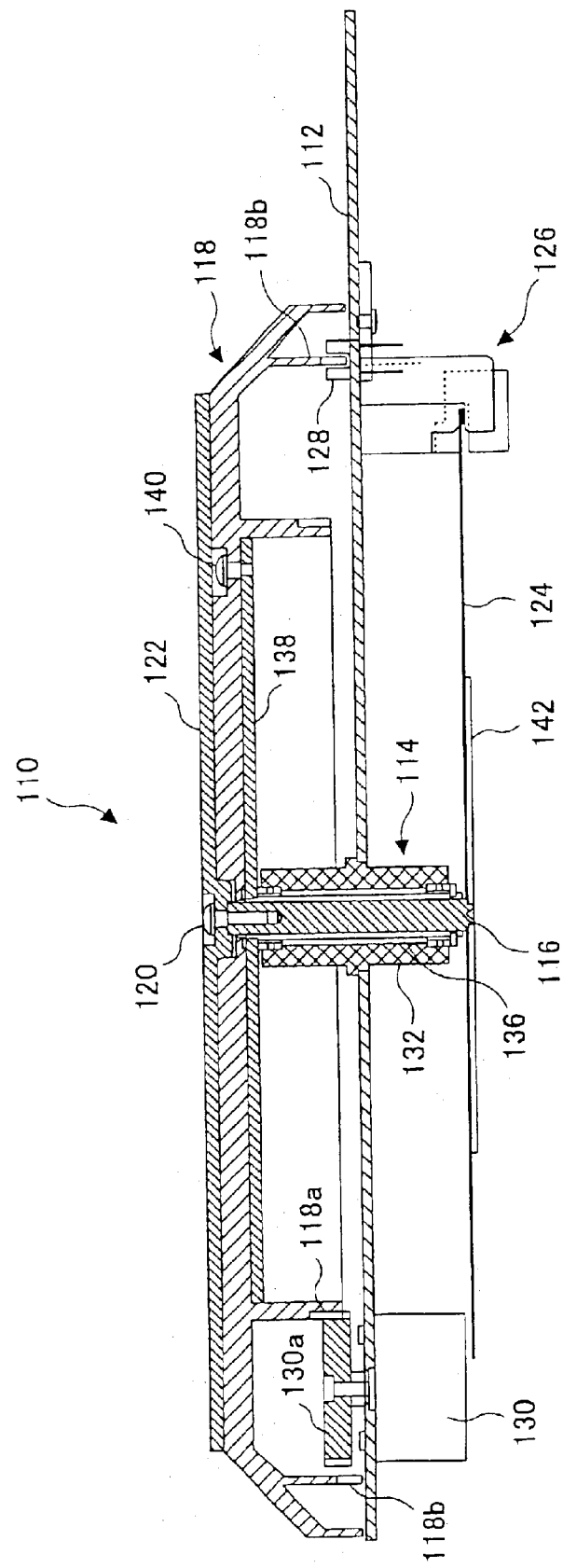
FIG. 4 is a longitudinal sectional view illustrating a scratch operating part according to a second embodiment of the present invention.
Figure 5:
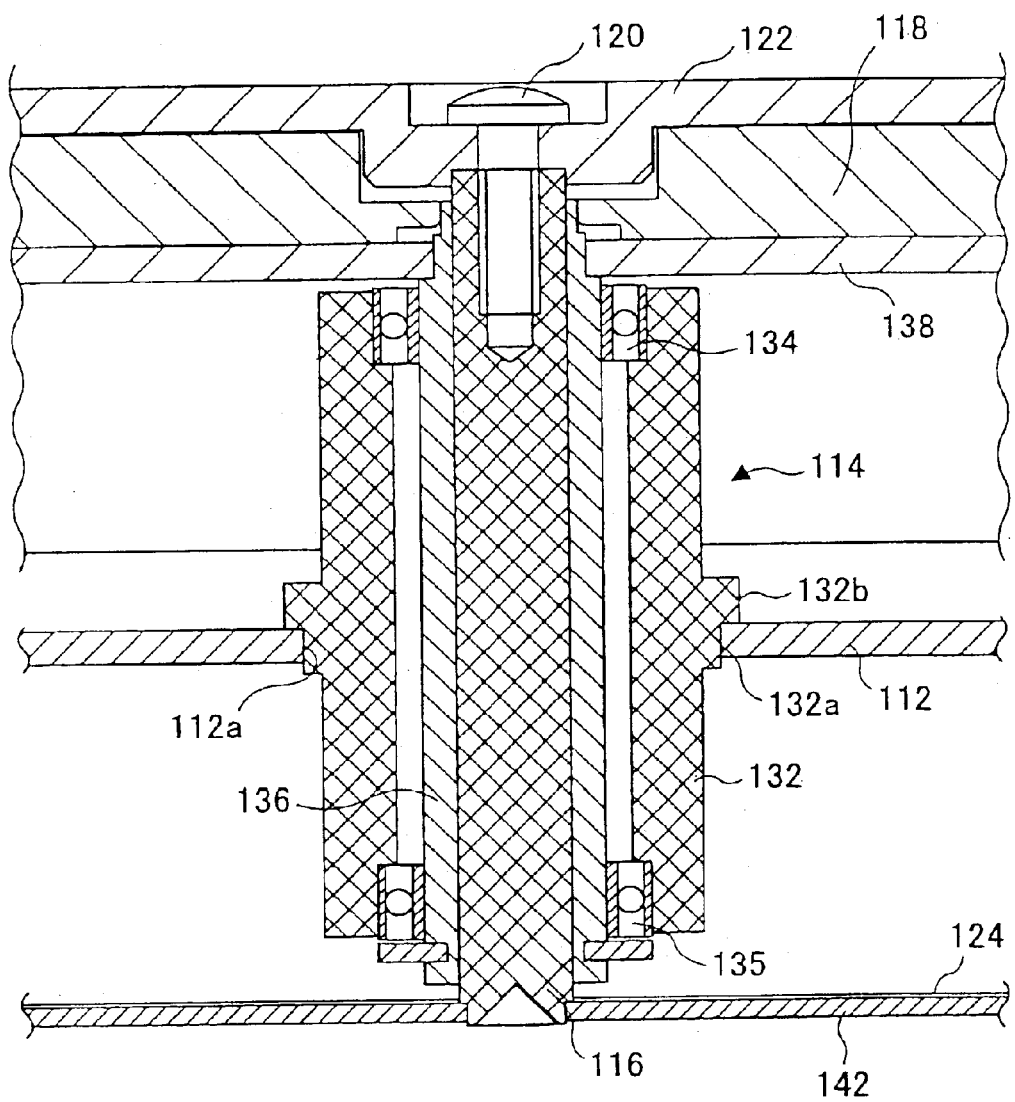
FIG. 5 is an enlarged longitudinal sectional view illustrating a structure of a bearing according to the second embodiment.
Figure 6:
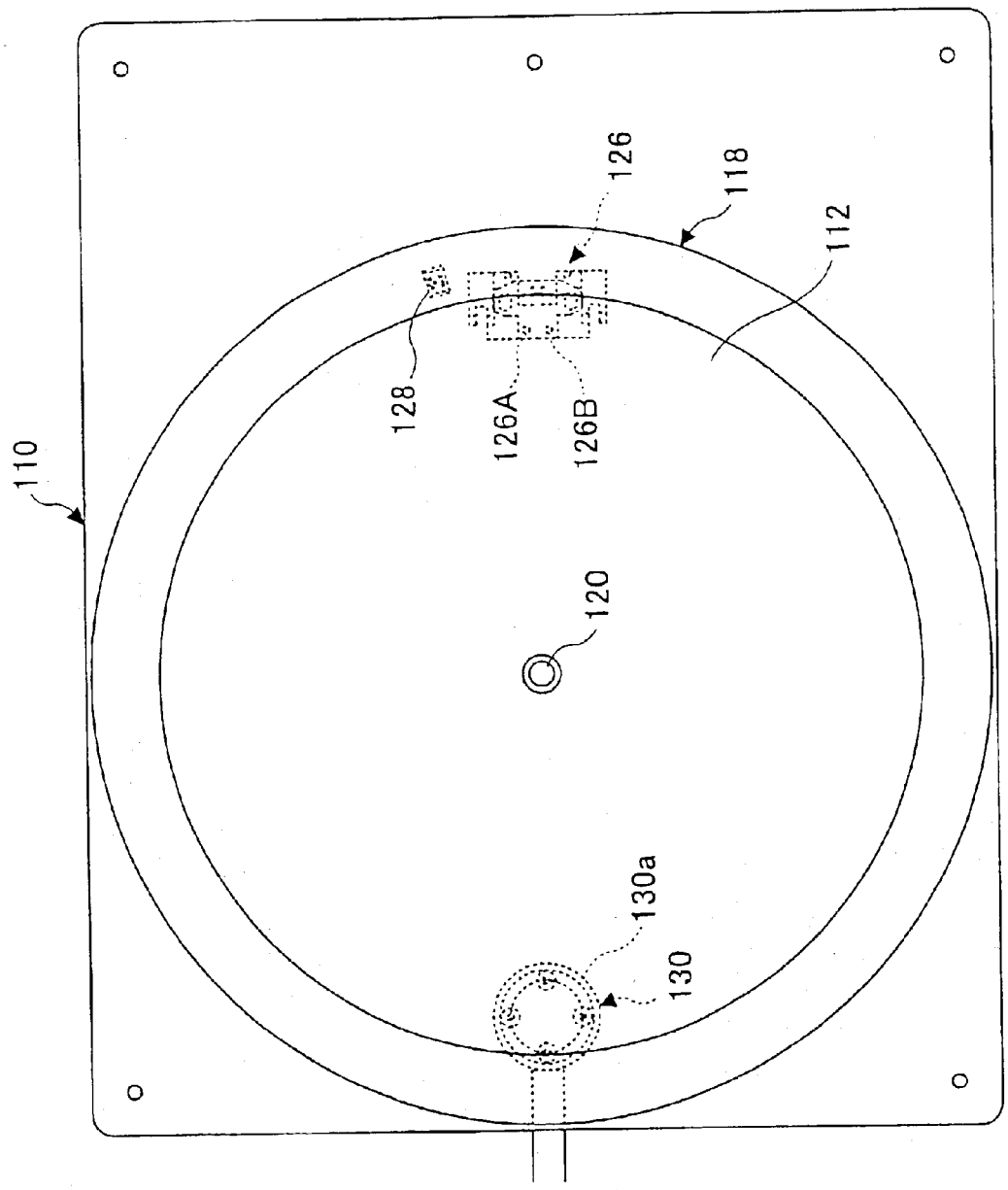
FIG. 6 is a plan view of a turntable according to the second embodiment.
Figure 7:
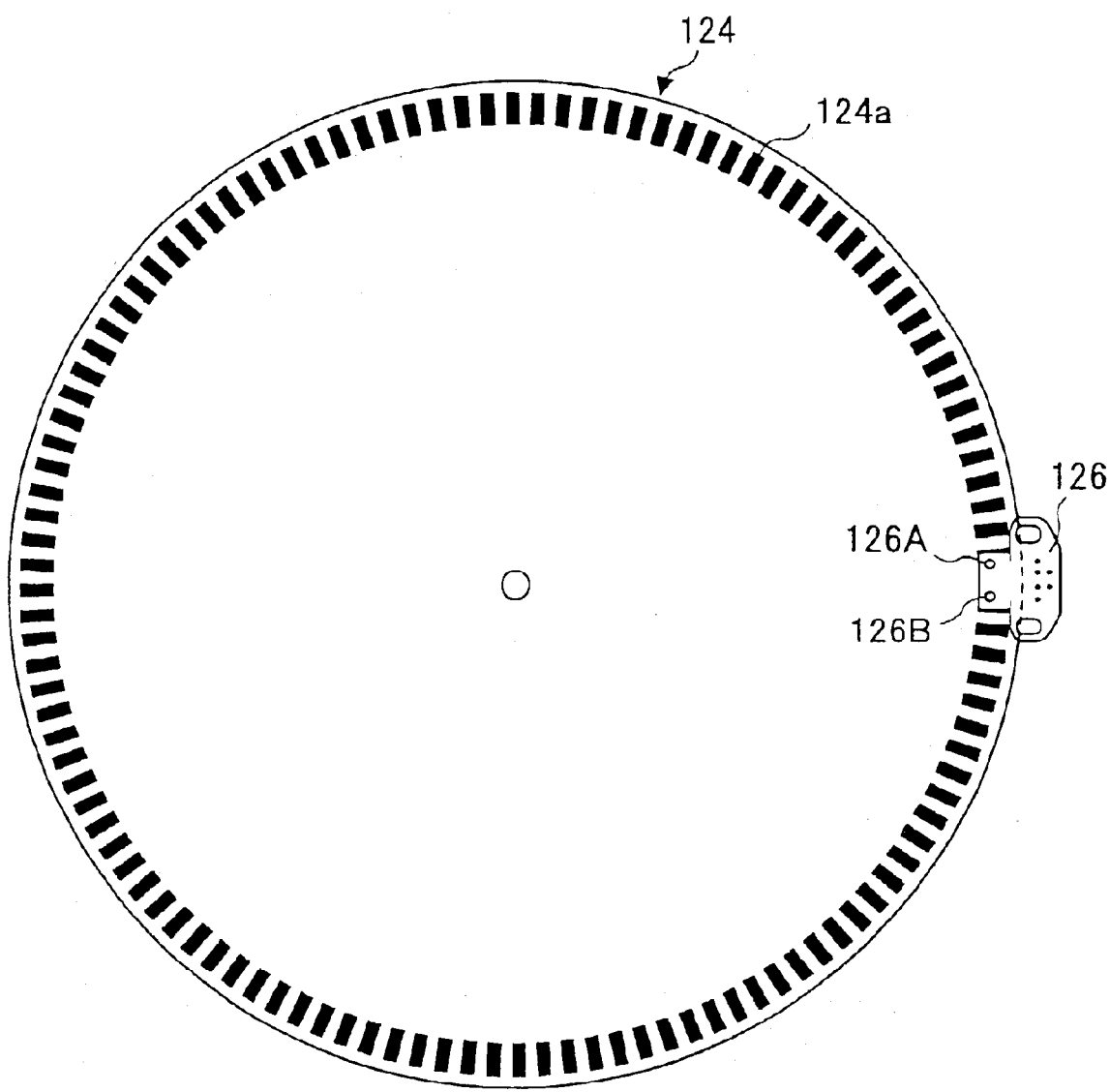
FIG. 7 is a plan view of a structure of an encoder according to the second embodiment.

FIG. 4 is a longitudinal sectional view illustrating a scratch operating part 110 according to a second embodiment of the present invention. FIG. 5 is an enlarged longitudinal sectional view illustrating a structure of a bearing according to the second embodiment. FIG. 6 is a plan view of a turntable according to the second embodiment. FIG. 7 is a plan view of a structure of an encoder according to the second embodiment.

As is shown in FIG. 4, the scratch operating part 110 according to the second embodiment of the present invention has a bearing part 114 piercing a chassis 112 in the vertical direction, a turntable (a first rotational operating part) 118 fixed on the upper end of a cylinder 136 piercing the bearing part 114, a disk (a second rotational operating part) 122 connected with the upper end of a rotational axis 116. piercing an inner cylinder 136 by means of a mounting bolt 120, an encoder 124 fixed on the lower end of the rotational axis 116, a sensor unit 126 detecting a ring-shaped slit 124a formed at a constant pitch (interval) in a marginal area of the encoder 124, a photo interrupter 128 detecting a rotation motion of the turntable 118, and a driving motor 130 rotationally driving the turntable 118.

The turntable 118 has a ring-shaped gear 118a projecting from the under surface. The gear 118a interlocks with a driving gear fixed to an axis 130a of the driving motor 130. Accordingly, the rotational force of the driving motor 130 is transmitted to the turntable 118 via the driving gear and the gear 118a. Since the driving motor 130 is formed with a comparative small motor, it is sufficient to prepare a small space to install the driving motor 130.

Also, the turntable 118 has a ring-shaped detected part 118b provided around the outer circumference of the turntable 118 further outside of the gear 118a and projecting from the under surface of the turntable 118. A photo interrupter 128 provided on a chassis 112 detects a concave part and a convex part formed on the lower end of the detected part 118b to find the rotational speed of the turntable 118.

As is shown in FIG. 5, the bearing part 114 comprises an outer cylinder 132 having a connection part 132a connected with a mounting aperture 112a of the chassis 112 and a collar part 132b joining to a part adjacent to the mounting aperture 112a, the inner cylinder 136 inserted into the central aperture of the outer cylinder 132 and provided to be free to rotate by means of a bearing 134 provided in the upper end of the outer cylinder 132 and a bearing 135 provided in the lower end of the outer cylinder 132, and a rotational axis 116 inserted into the central aperture of the inner cylinder 136 and provided to be free to rotate toward the inner cylinder 136.

The turntable 118 is fixed to the inner cylinder 136 in a state of being connected to a disk-shaped reinforcing plate 138 with a mounting bolt 140 and is provided to be free to rotate toward the rotational axis 116 and the outer cylinder 132. A disk 122 is fixed on the upper end of the rotational axis 116 sustained by the inner cylinder 136 in a state of being free to rotate. When the scratch operation is performed, the disk 122 rotates together with the rotational axis 116 in the clockwise direction or the counterclockwise direction.

When an operator does not manipulate the disk 122, the disk 122 moves together with the turntable 118 by a frictional force against the turntable 118. When the operator manipulates the disk 122, the disk 122 moves separately from the turntable 118.

As is shown in FIG. 4, the disk-shaped encoder 124 connected to the lower end of the rotational axis 116 is sustained so that the under surface of the encoder 124 can be firmly fixed on the reinforcing plate 142.

As is shown in FIG. 6 and FIG. 7, the sensor unit 126 has a pair of photo interrupters 126A and 126B in a housing and determines whether or not rectangular slits (apertures) 124a located in a radial form around a marginal area of the encoder 124 pass through the sensor unit 126. The photo interrupter 126A detects the slits 124a of the encoder 124 rotating together with the disk 122 at a distant position from the disk 122. As a result, the CPU 42 can find the rotational speed of the disk 122.

Additionally, the CPU 42 can not only detect the rotational direction (the clockwise direction or the counterclockwise direction) of the disk 122 based upon a phase difference between signals from the photo interrupters 126A and 126B but also determine whether or not a scratch operation is performed for the disk 122 or the turntable 118 by comparing a detection signal from a photo interrupter 128 to the signals from the photo interrupters 126A and 126B.

Figure 8:
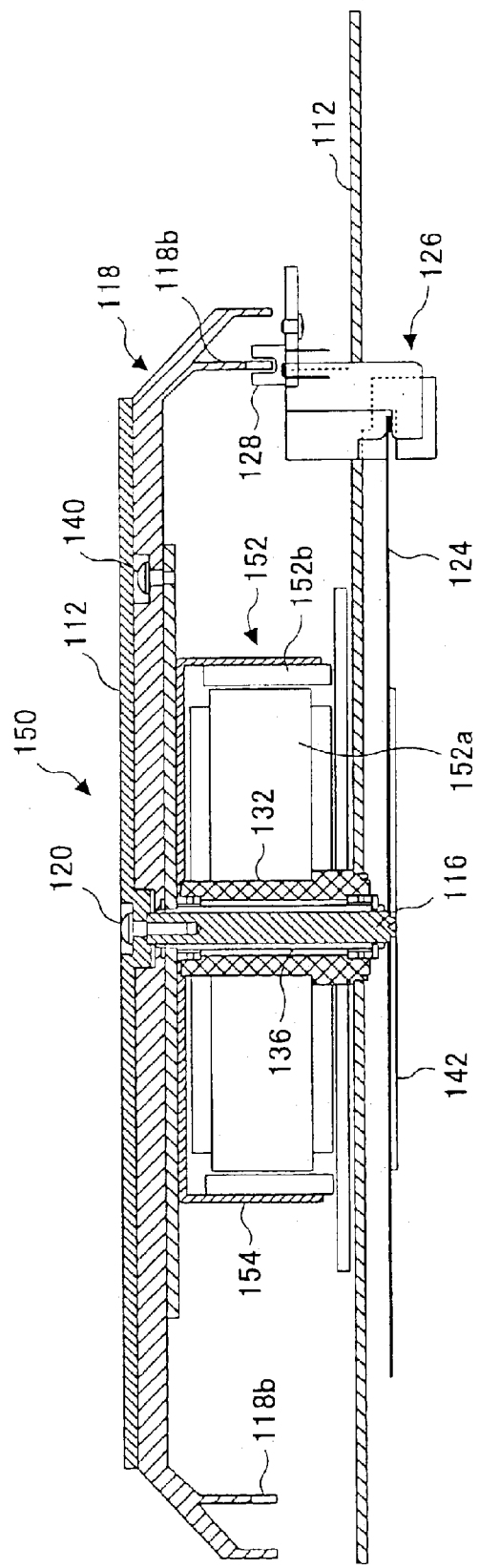
FIG. 8 is a longitudinal sectional view illustrating a structure of a scratch operating part according to a third embodiment of the present invention.

FIG. 8 is a longitudinal sectional view illustrating a structure of a scratch operating part 150 according to a third embodiment of the present invention, wherein those parts in FIG. 8 corresponding to the parts in FIG. 4 are designated by the same reference numerals and the description thereof will be omitted.

As is shown in FIG. 8, a scratch operating part 150 according to the third embodiment of the present invention is provided to rotationally drive the turntable 118 by means of a DD (direct drive) motor 152 that does not use any gear instead of the driving motor 130 mentioned in the second embodiment.

A stator 152a of the DD motor 152 is connected to the outer circumference of the outer cylinder 132, and a rotor 152b is mounted on the under surface of the turntable 118 through an L-shaped bracket 154. Thus, the turntable 118 rotates with no medium of the gear by the rotational force directly transmitted from the DD motor 152.

As mentioned above, under the scratch operating part 150 according to the third embodiment, it is possible to directly control a rotational motion of the turntable 118 and decrease noise and burden caused by the gear.

The above-mentioned embodiments focus on the reproducing part constructed to reproduce a CD. However, the reproducing part is not limited to the construction focused on the purpose. For example, the reproducing part may reproduce an arbitrary piece of music from a recording medium such as a hard disk apparatus saving music data or a memory card saving music data.

The present invention is not limited to the specifically disclosed embodiments, and variations and modifications may be made without departing from the scope of the present invention.

The present application is based on Japanese priority application No. 2002-057826 filed Mar. 4, 2002, the entire contents of which are hereby incorporated by reference.

What is claimed is:

1. A reproducer, comprising:

a reproducing part reproducing information;

a driving part transmitting a rotational force;

a first rotational operating part rotationally driven by said driving part and rotationally driven manually;

a second rotational operating part capable of integrally rotating together with said first rotational operating part and rotating relative to said first rotational operating part manually;

a detecting part detecting a rotational motion of said second rotational operating part; and a control part changing a reproducing speed of said reproducing part according to a detection result of said detecting part.

2. The reproducer as claimed in claim 1, wherein said second rotational operating part has a detected part inserted into a transparent detection groove formed in said first rotational operating part, and said detecting part detects said detected part in an inner circumference and an outer circumference of said detection groove.

3. The reproducer as claimed in claim 1, wherein said second rotational operating part has a disk-shaped operation surface provided on said first rotational operating part and a ring-shaped detected part projecting downward from said disk-shaped operation surface, the operation surface operated by receiving pressure in a rotational direction, and wherein said detecting part detects a rotational speed and a rotational direction of said ring-shaped detected part.

4. The reproducer as claimed in claim 1, wherein said detecting part detects a rotational speed based upon a frequency of a signal detected by an optical sensor and a rotational direction based upon a phase difference of a signal detected by an optical sensor.

5. The reproducer as claimed in claim 1, wherein said first rotational operating part has a turntable on which said second rotational operating part is placed, a first detected part provided integrally around an outer circumference of said turntable, a cavitary rotational axis sustaining said turntable capable of rotating, and a rotational axis piercing said cavitary rotational axis, the rotational axis connected with said second rotational operating part on one end of the rotational axis and a second detected part on the other end of the rotational axis.

* * * * *